No. 806,392. PATENTED DEC. 5, 1905.
B. B. BOLTON.
PHOTOMETER.
APPLICATION FILED MAR. 10, 1902. RENEWED OCT. 19, 1904.

WITNESSES
Chas. L. Hyde.
M. C. Nickelson.

INVENTOR
Becher B Bolton
BY Hazard & Harpham
ATTORNEYS.

UNITED STATES PATENT OFFICE.

BECHER B. BOLTON, OF WILMINGTON, CALIFORNIA, ASSIGNOR TO HENRY T. HAZARD AND GEORGE E. HARPHAM, OF LOS ANGELES, CALIFORNIA.

PHOTOMETER.

No. 806,392.  Specification of Letters Patent.  Patented Dec. 5, 1905.

Application filed March 10, 1902. Renewed October 19, 1904. Serial No. 229,159.

*To all whom it may concern:*

Be it known that I, BECHER B. BOLTON, a citizen of the United States, residing at Wilmington, in the county of Los Angeles, State of California, have invented new and useful Improvements in Photometers, of which the following is a specification.

My invention relates to an instrument designed for use in conjunction with a camera for taking pictures; and the object thereof is to provide an instrument by means of which the time which a plate must be exposed to produce a satisfactory picture is readily determined. I accomplish this object by means of the instrument described herein and illustrated in the accompanying drawings, in which—

Figure 1:
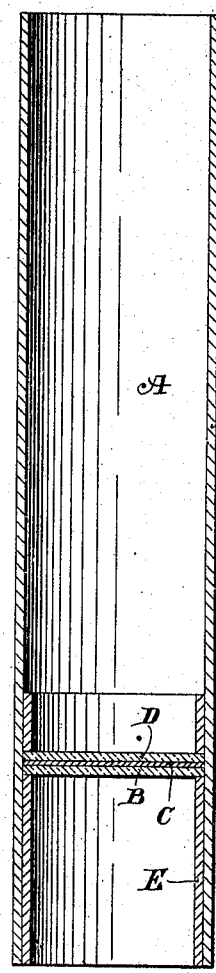
Figure 2:
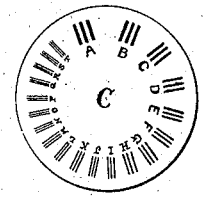

Figure 1 is a central longitudinal section of my photometer. Fig. 2 is a plan of the test-scale used therein.

In the drawings, A is a tube of opaque material, preferably of aluminium or brass, about one and one-half inches in diameter and about seven inches in length. I have found that these dimensions produce very satisfactory results; but other dimensions may be used, if desired. In one end of the tube, at a distance of approximately the diameter of the tube and extending transversely thereof, is a filtering-disk B, of a material which is adapted to filter out the larger portion of those rays of light which have but little, if any, chemical effect upon the sensitized photographic plate and to permit the passage therethrough of those rays which do affect such plate. In practice I have found a disk of glass about the thickness of light window-glass and colored a grass-green color produces satisfactory results. Adjacent to the filtering-disk is test-scale C, which is made of light thin white paper, having printed thereon groups of black lines of various thickness, each group of lines being lettered with a different letter of the alphabet. Any other symbol may be used as a test-scale, if desired. This test-scale is held in contact with the filtering-disk by a protecting-disk D of clear transparent glass. These disks and scale are held in position by collars E, of paper or pasteboard, secured to the tube by paste or other means. For use with my photometer I have designed a reference-table consisting of twenty columns lettered from "A" to "T" to correspond with the lettering of the groups of lines on the test-scale. On the left of the "A" column are two columns giving the sizes of the stops used according to two well-known systems. In the different lettered columns I have placed figures denoting the seconds and fractions of seconds of time that a rapid standard plate must be exposed to produce the best result.

My photometer is used as follows: When the operator finds a view which he desires to photograph, he arranges his camera in the usual manner to take the same. Then he takes the photometer and places the same with the end of the tube farthest from the test-scale at his eye and then places himself near the camera and levels the photometer toward the view to be taken and looks through the tube. The lightest group of lines which the operator can distinguish clearly shows the density of the light, and the letter which this group possesses shows the column in the table which determines the length of time that the plate must be exposed. The operator then selects in the stop-column the size of stop he is using and follows the horizontal line indicated thereby until it intersects the vertical column of the indicated letter, where the required time for the exposure of the plate in such light is indicated. This table I have prepared by careful experiments with the camera and the photometer and is as follows. The most rapid standard plates only are to be used with this table.

| Stops. | | | | | | | | | | | | | | | | | | | | | |
|---|---|---|---|---|---|---|---|---|---|---|---|---|---|---|---|---|---|---|---|---|---|
| U.S. | f | A | B | C | D | E | F | G | H | I | J | K | L | M | N | O | P | Q | R | S | T |
| 4 | f-8 | 5 | 3 | 1¼ | ⅝ | ⅜ | ¼ | 1-5 | ⅛ | ⅛ | 1-10 | 1-12 | 1-16 | 1-20 | 1-24 | 1-28 | 1-36 | 1-42 | 1-48 | 1-64 | 1-96 |
| 8 | f-11 | 9 | 5 | 2 | 1¼ | ¾ | ½ | ¼ | ⅛ | 1-5 | ⅛ | 1-10 | 1-12 | 1-16 | 1-20 | 1-24 | 1-28 | 1-36 | 1-40 | 1-45 | 1-48 |
| 16 | f-16 | 12 | 8½ | 4 | 2 | 1¼ | 1 | ¾ | ½ | ⅜ | ¼ | ⅛ | 1-10 | 1-12 | 1-16 | 1-20 | 1-22 | 1-23 | 1-24 |
| 32 | f-22 | 20 | 12 | 8 | 5 | 2¼ | 1¼ | 1¼ | 1 | ½ | ⅜ | ⅜ | ⅜ | ⅜ | 1-5 | ⅛ | 1-16 | 1-10 | 1-11 | 1-12 |
| 64 | f-32 | 42 | 30 | 20 | 12 | 10 | .8 | 6 | 5 | 4¼ | 3 | 2½ | 2½ | 2¼ | 2 | 1⅝ | 1⅝ | 1⅜ | ¾ |
| 128 | f-45 | 90 | 60 | 40 | 24 | 16 | 10 | 8 | 6 | 5 | 4¼ | 4 | 3½ | 3 | 2½ | 2 | 1½ | 1½ | 1 | ½ | ¼ |
| 256 | f-64 | 180 | 100 | 60 | 36 | 22 | 14 | 10 | 8¼ | 6¼ | 5¼ | 5 | 4½ | 4 | 3½ | 3 | 2¼ | 2¼ | 1⅝ | 1¼ | 1 |

It will be observed that my photometer is adapted for use with other tables prepared in like manner for the use of other less-sensitive plates, it being only necessary to have the test-scale adapted for use therewith without departing from the spirit of my invention, which consists in providing an opaque tube with a transverse test-scale of semitransparent material having graduated characters thereon between the ends thereof so arranged that they are gradually discernible as the intensity of the light increases.

Having described my invention, what I claim as new, and desire to secure by Letters Patent, is—

1. A photometer comprising an opaque tube, a semitransparent test-scale having printed characters thereon of different degrees of density; and a ray-filter composed of green glass mounted in said tube near one end thereof.

2. A photometer comprising an opaque tube; a semitransparent test-scale having characters thereon of different degrees of density; and a filter, said scale and filter being mounted in said tube near one end thereof; said filter being adapted to intercept such rays of light as do not affect the sensitized plate of a camera.

3. A photometer composed of an opaque tube having therein a test-scale of semitransparent material with characters of different degrees of density thereon, said scale being arranged in said tube transversely at a distance from the ends thereof.

4. A photometer composed of an opaque tube having therein between the ends thereof and transversely thereto a test-scale of semitransparent material with characters thereon which are graduated to be gradually discernible as the intensity of the light increases.

In witness that I claim the foregoing I have hereunto subscribed my name this 4th day of March, 1902.

BECHER B. BOLTON.

Witnesses:
G. E. HARPHAM,
HENRY T. HAZARD.